(12) United States Patent
Yu et al.

(10) Patent No.: US 9,990,009 B2
(45) Date of Patent: Jun. 5, 2018

(54) OUTPUT CONTROL USING GESTURE INPUT

(75) Inventors: Kun Yu, Sydney (AU); Hao Ui Wang, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 526 days.

(21) Appl. No.: 13/518,189

(22) PCT Filed: Dec. 22, 2009

(86) PCT No.: PCT/CN2009/075819
§ 371 (c)(1),
(2), (4) Date: Jun. 21, 2012

(87) PCT Pub. No.: WO2011/075883
PCT Pub. Date: Jun. 30, 2011

(65) Prior Publication Data
US 2012/0256866 A1    Oct. 11, 2012

(51) Int. Cl.
*G06F 3/048* (2013.01)
*G06F 1/16* (2006.01)
*G06F 3/0481* (2013.01)

(52) U.S. Cl.
CPC .......... *G06F 1/1694* (2013.01); *G06F 3/0481* (2013.01); *G06F 2200/1637* (2013.01); *G06F 2203/04805* (2013.01); *G06F 2203/04806* (2013.01)

(58) Field of Classification Search
CPC .... G06F 3/041; G06F 3/0481; G06F 3/04845; G06F 3/0484; G06F 3/0346; G06F 2203/04805; G06F 2203/04806; H04N 1/3877
See application file for complete search history.

(56) References Cited

U.S. PATENT DOCUMENTS

2005/0219223 A1* 10/2005 Kotzin et al. ................ 345/173
2006/0258194 A1* 11/2006 Cho et al. .................... 439/108
2008/0048980 A1*  2/2008 Love ..................... G06F 1/1613
                                                              345/158

(Continued)

FOREIGN PATENT DOCUMENTS

| CN | 1747573 A | 3/2006 |
| CN | 1863225 A | 11/2006 |
| CN | 101588561 A | 11/2009 |

OTHER PUBLICATIONS

International Search Report for Application No. PCT/CN2009/075819 dated Oct. 28, 2010.

*Primary Examiner* — Kenneth Bukowski
(74) *Attorney, Agent, or Firm* — Alston & Bird LLP (57) ABSTRACT

An apparatus, including: at least one processor; and at least one memory storing computer program instructions, the at least one processor being configured to execute the computer program instructions to cause the apparatus at least to perform: detecting user input; selecting, in dependence upon the detected user input, at least a portion of an output of a user output device; determining, while the at least a portion of the output of the user output device is selected, whether a user makes a gesture input by moving the apparatus; and altering, in response to determining that the gesture input has been made by the user, the selected at least a portion of the output of the user output device.

25 Claims, 7 Drawing Sheets

(56) References Cited

U.S. PATENT DOCUMENTS

2009/0280860 A1* 11/2009 Dahlke .................. 455/556.1
2009/0291706 A1   11/2009 Lee et al.
2013/0121606 A1*  5/2013 Chien .................... G06T 5/005
                                                  382/260

* cited by examiner

OUTPUT CONTROL USING GESTURE INPUT

FIELD OF THE INVENTION

Embodiments of the present invention relate to controlling output using gesture input. In particular, they relate to controlling the aural or visual output of a portable electronic apparatus using gesture input.

BACKGROUND TO THE INVENTION

The functionality and processing power provided by portable electronic devices such as mobile telephones has increased significantly in recent years. Some portable electronics devices now perform a diverse range of functions. For example, some mobile telephones now provide camera and music playing functionality.

The introduction of this functionality means has led to some portable electronic devices having a more complex user interface, making them difficult to use.

BRIEF DESCRIPTION OF VARIOUS EMBODIMENTS OF THE INVENTION

According to various, but not necessarily all, embodiments of the invention there is provided an apparatus, comprising: at least one processor; and at least one memory storing computer program instructions, the at least one processor being configured to execute the computer program instructions to cause the apparatus at least to perform: detecting user input; selecting, in dependence upon the detected user input, at least a portion of an output of a user output device; determining, while the at least a portion of the output of the user output device is selected, whether a user makes a gesture input by moving the apparatus; and altering, in response to determining that the gesture input has been made by the user, the selected at least a portion of the output of the user output device.

According to various, but not necessarily all, embodiments of the invention there is provided a method, comprising: detecting user input; selecting, in dependence upon the detected user input, at least a portion of an output of a user output device; determining, while the at least a portion of the output of the user output device is selected, whether a user makes a gesture input by moving the apparatus; and altering, in response to determining that the gesture input has been made by the user, the selected at least a portion of the output of the user output device.

According to various, but not necessarily all, embodiments of the invention there is provided a computer program comprising computer program instructions that, when executed by at least one processor, cause an apparatus at least to perform: detecting user input; selecting, in dependence upon the detected user input, at least a portion of an output of a user output device; determining, while the at least a portion of the output of the user output device is selected, whether a user makes a gesture input by moving the apparatus; and altering, in response to determining that the gesture input has been made by the user, the selected at least a portion of the output of the user output device.

According to various, but not necessarily all, embodiments of the invention there is provided an apparatus, comprising: means for detecting user input; means for selecting, in dependence upon the detected user input, at least a portion of an output of a user output device; means for determining, while the at least a portion of the output of the user output device is selected, whether a user makes a gesture input by moving the apparatus; and means for altering, in response to determining that the gesture input has been made by the user, the selected at least a portion of the output of the user output device.

According to various, but not necessarily all, embodiments of the invention there is provided an apparatus, comprising: a touch sensitive display; at least one processor; and at least one memory storing computer program instructions, the at least one processor being configured to execute the computer program instructions to cause the apparatus at least to perform: detecting user input at the touch sensitive display; selecting, in dependence upon the user input detected at the touch sensitive display, content displayed on the touch sensitive display; determining, while the content displayed on the touch sensitive display is selected, whether a user makes a gesture input by moving the apparatus; and applying, in response to detecting the gesture input, a visual effect to the selected content displayed on the touch sensitive display.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Embodiments of the invention relate to controlling the aural or visual output of an apparatus using gesture input. Gesture input, in the form of movement of the apparatus, causes the portion of aural or visual output to be altered. The aural or visual output may, for example, be altered by applying an aural or visual effect.

The Figures illustrate an apparatus 10/30, comprising: at least one processor 12; and at least one memory 14 storing computer program instructions 18, the at least one processor 12 being configured to execute the computer program instructions 18 to cause the apparatus 10/30 at least to perform: detecting user input; selecting, in dependence upon the detected user input, at least a portion of an output of a user output device 22/24/27; determining, while the at least a portion of the output of the user output device 22/24/27 is selected, whether a user makes a gesture input by moving the apparatus 10/30; and altering, in response to determining that the gesture input has been made by the user, the selected at least a portion of the output of the user output device 22/24/27.

Figure 1:
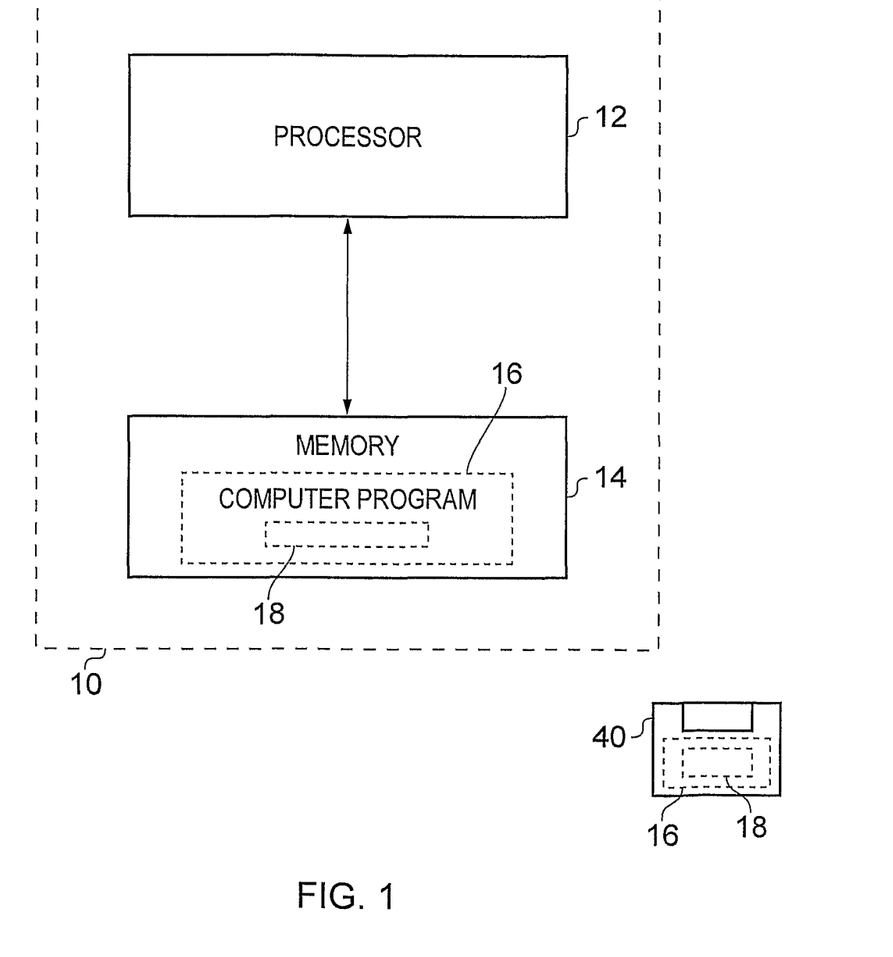
FIG. 1 illustrates an apparatus.

FIG. 1 illustrates an apparatus 10. The apparatus may, for example, be a chip or a chip-set. The apparatus 10 illustrated in FIG. 1 comprises a processor 12 and a memory 14. In alternative embodiments of the invention, the apparatus 10 may comprise multiple processors.

The processor 12 is configured to read from and write to the memory 14. The processor 12 may also comprise an output interface via which data and/or commands are output by the processor 12 and an input interface via which data and/or commands are input to the processor 12.

Although the memory 14 is illustrated as a single component it may be implemented as one or more separate components, some or all of which may be integrated/removable and/or may provide permanent/semi-permanent/dynamic/cached storage.

The memory 14 stores a computer program 16 comprising computer program instructions 18 that control the operation of the apparatus 10/30 when loaded into the processor 12. The computer program instructions 18 provide the logic and routines that enables the apparatus 10/30 to perform the method illustrated in FIG. 3. The processor 12 by reading the memory 14 is able to load and execute the computer program instructions 18.

The computer program 16 may arrive at the apparatus 10 via any suitable delivery mechanism 40. The delivery mechanism 40 may be, for example, a tangible computer-readable storage medium, a computer program product, a memory device, a record medium such as a CD-ROM, DVD or Blu-Ray disc, or any article of manufacture that tangibly embodies the computer program 16. The delivery mechanism 40 may be a signal configured to reliably transfer the computer program 16.

Figure 2:
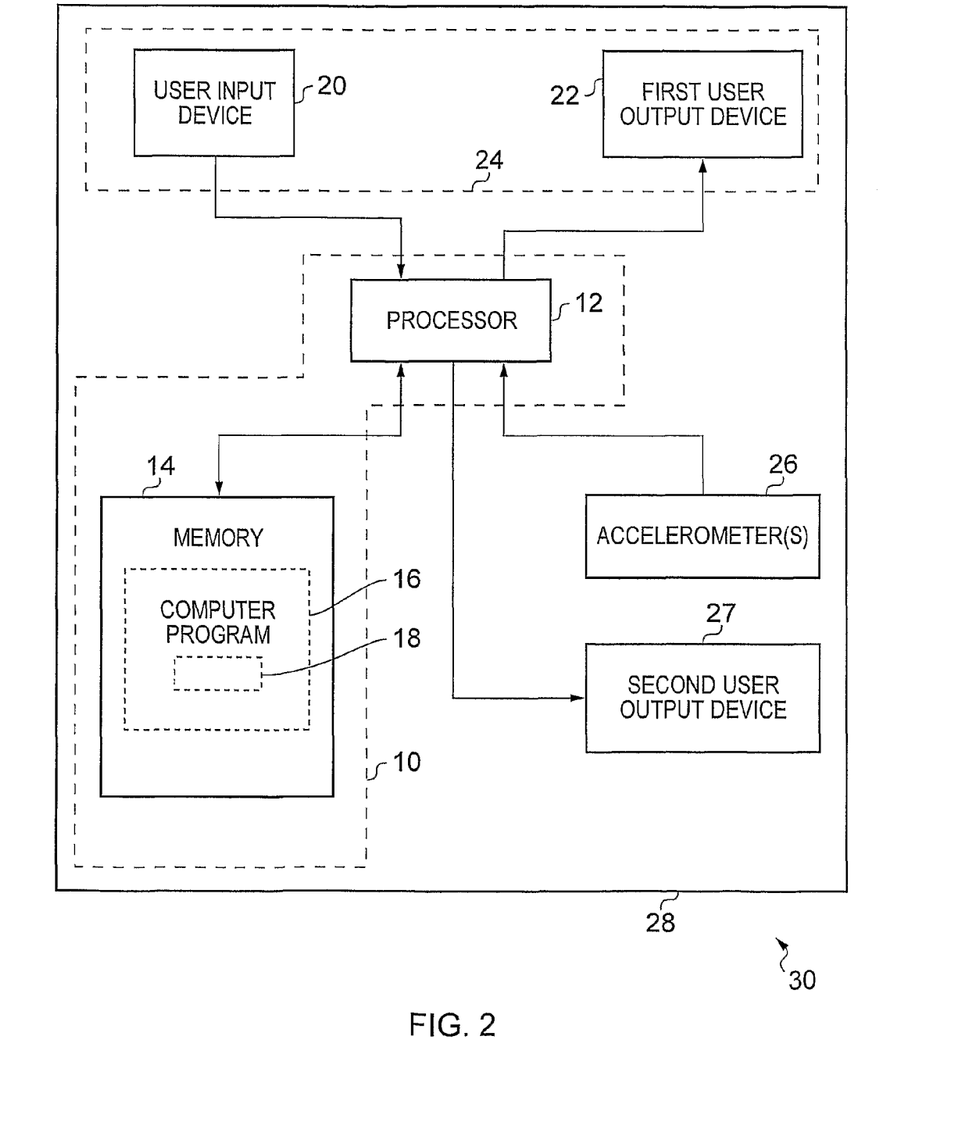
FIG. 2 illustrates a further apparatus.

FIG. 2 illustrates a further apparatus 30. The apparatus 30 illustrated in FIG. 2 may, for example, be a portable electronic apparatus such as a mobile telephone, a personal music player, a personal digital assistant, or a camera.

The apparatus 30 illustrated in FIG. 2 comprises the apparatus 10 illustrated in FIG. 1. The apparatus 30 further comprises a housing 28 which houses: the processor 12, the memory 14, a user input device 20, first and second user output devices 22, 27, and at least one accelerometer 26. The elements 12, 14, 20, 22, 26 and 27 are co-located within the housing 28.

The processor 12 is configured to provide an output to the first and second user output devices 22, 27 and to receive an input from the user input device 20 and the one or more accelerometers 26. The elements 12, 14, 20, 22, 26 and 27 are operationally coupled and any number or combination of intervening elements can exist (including no intervening elements).

The first user output device 22 may, for example, be a display. In some embodiments of the invention, the user input device 20 and the first user output device 22 are combined in a touch sensitive display 24. In other embodiments, the first user output device 22 and the user input device 20 are separate. For example, the user input device 20 may be (or comprise) a keypad and/or a microphone. The second user output device 27 may, for example, be a loudspeaker.

An exemplary method according to embodiments of the invention will now be described in relation to FIGS. 3, 4, 5A and 5B. In this example, gesture input is used to apply a visual effect.

Figure 5A:
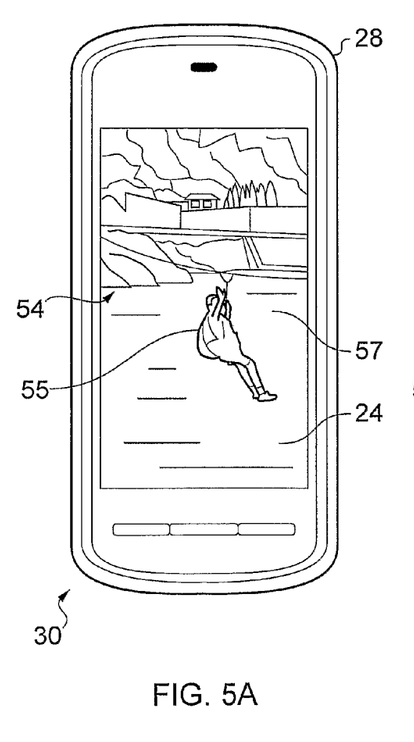
FIG. 5A illustrates an apparatus displaying an image.

FIG. 5A illustrates the apparatus 30 displaying an image 54 on a touch sensitive display 24. The image 54 includes first and second content 55, 57. In this example, the first content is a person 55 in the foreground of the image and the second content is the background of the image 57.

Figure 3:
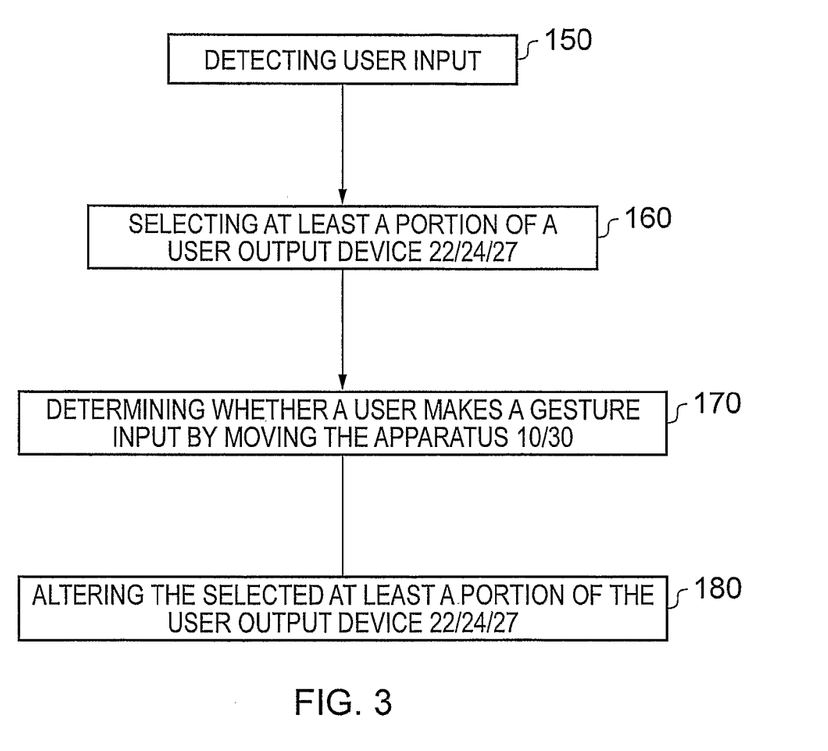
FIG. 3 illustrates a flow chart of a method.

At block 150 of FIG. 3, the processor 12 detects user input at the user input device 20. Since, in this particular example, the user input device 20 and the first user output device 22 are combined in a touch sensitive display 24, the user provides the input by touching the touch sensitive display 24.

In this particular example, the user provides an input indicating the content on the display 24 that he wishes to remain unaltered. The user touches the first content 55, which in this example is the person in the foreground of the image 54.

At block 160 of FIG. 3, the processor 12 selects a portion of the output of the display 24 for alteration. The selection made by the processor 12 depends upon the user input provided by the user. In this example, since the user has provided input indicating that he wishes the first content (the person) 55 to remain unaltered, the processor 12 selects the second content (the background) 57 as the portion for alteration.

In some embodiments of the invention, the processor 12 may distinguish the second content 57 from the first content 55 by merely selecting all of the parts of the image that the user does not touch. In other embodiments of the invention, the processor 12 may perform the selection by performing a processing algorithm to distinguish the second content 57 from the first content 55. For example, the processing algorithm may comprise identifying differences in contrast in the area of the image 54 identified by the input from the user, in order to distinguish the second content 57 from the first content 55.

The processor 12 may or may not control the display to display an indication that the second content 57 has been selected for alteration (for example, by highlighting).

At block 170 of FIG. 3, the processor 12 determines, while the portion 57 of the output 54 of the display 24 is selected, whether the user makes a gesture input by moving the apparatus 10/30. One example of a gesture input is illustrated in FIG. 4.

Figure 4:
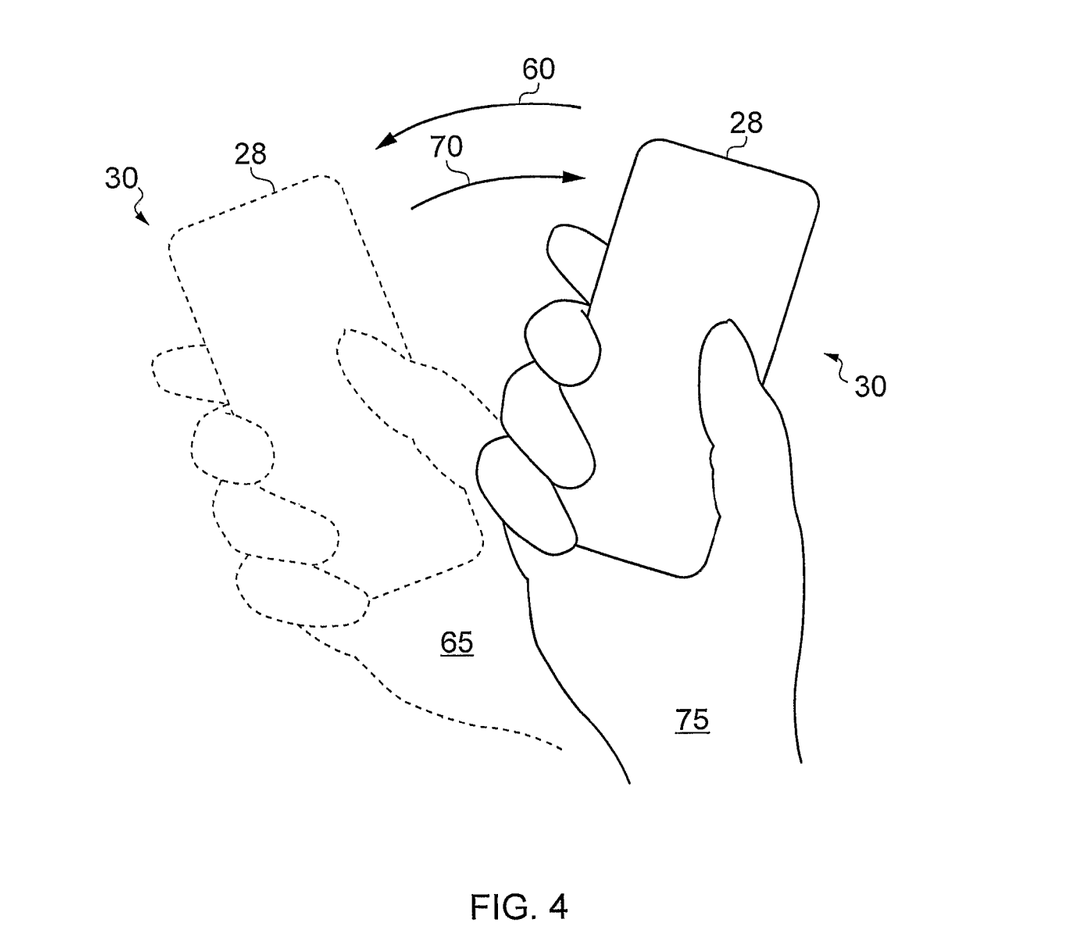
FIG. 4 illustrates a first gesture input.

The gesture input illustrated in FIG. 4 is a shaking gesture which involves placing the apparatus 10/30 into reciprocal motion. The user initially moves the apparatus 10/30 in a first direction 60, from a first position 75 to a second position 65. The user then moves the apparatus 10/30 in a second direction 70, from the second position 65 to approximately the first position 75. The second direction 70 is substantially opposite to the first direction 60. The user continually moves the apparatus 10/30 from the first position 75 to the second position 65, and vice versa, such that the apparatus is in reciprocal motion. While the gesture input of FIG. 4 is being performed by the user, the apparatus 10/30 moves to a greater extent horizontally than vertically.

The processor 12 determines that the gesture input illustrated in FIG. 4 has been made by processing inputs received from the accelerometer(s) 26. For example, the processor 12 may determine that the gesture input has been made if the acceleration measured by the accelerometer(s) 26 is consistent with the gesture input illustrated in FIG. 4.

For example, the processor 12 may determine that the acceleration measured by the accelerometers is consistent with the gesture input illustrated in FIG. 4 by analyzing one or more acceleration vectors measured by the accelerometer(s) 26 over a period of time. The processor 12 may also determine whether the acceleration of the apparatus 10/30 exceeds a threshold value.

Figure 5B:
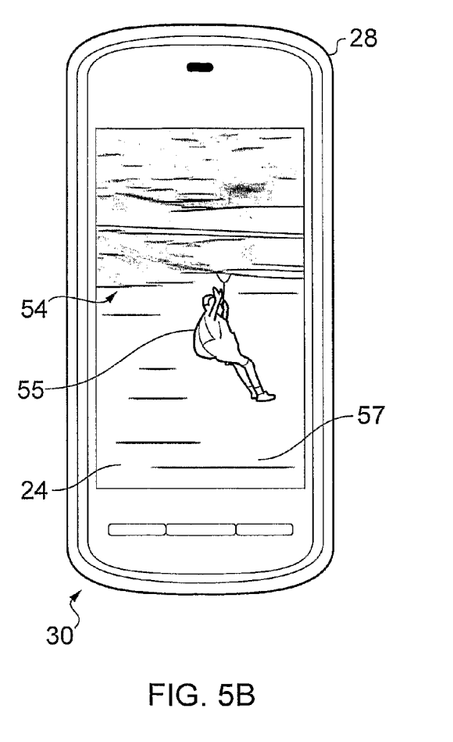
FIG. 5B illustrates an apparatus displaying an image after a visual effect has been applied.

At block 180 of FIG. 3, in response to determining that a gesture input has been made by a user, the processor 12 alters the selected portion 57 of the output 54 of the display 24. In this example, the processor 12 alters the selected second content 57 by applying a visual effect to it. FIG. 5B illustrates the apparatus 30 after a visual effect has been applied to the selected second content 57. In this example, the visual effect is a "blurring effect", in which the second content 57 is blurred, such that it appears as if the first content 55 is in motion.

The alteration of the selected portion 57 of the output 54 of the display 54 may depend upon the magnitude of the acceleration measured by the accelerometer(s) 26. For example, the "blurring effect" may be more pronounced if the apparatus 10/30 is shaken more vigorously.

Advantageously, embodiments of the invention provide a method of enabling a user to alter the output of a user output device, such as a display, in a straightforward and intuitive manner.

The processor 12 may be configured to alter the output 54 of the display 24 differently, depending upon the gesture input provided by the user. For instance, the processor 12 may be configured to alter the output 54 by performing a first processing algorithm on the output 54 in response to determining that a first gesture input has been made, or by performing a second processing algorithm on the output 54 in response to determining that a second gesture input has been made.

As explained above, while the gesture input of FIG. 4 is being performed by the user, the apparatus 30 moves to a greater extent horizontally than vertically. Consequently, the processor 12 applies a "blurring effect" to the second content 57 in the FIG. 5B example that makes the first content 55 appear as if it is in horizontal motion.

Figure 6:
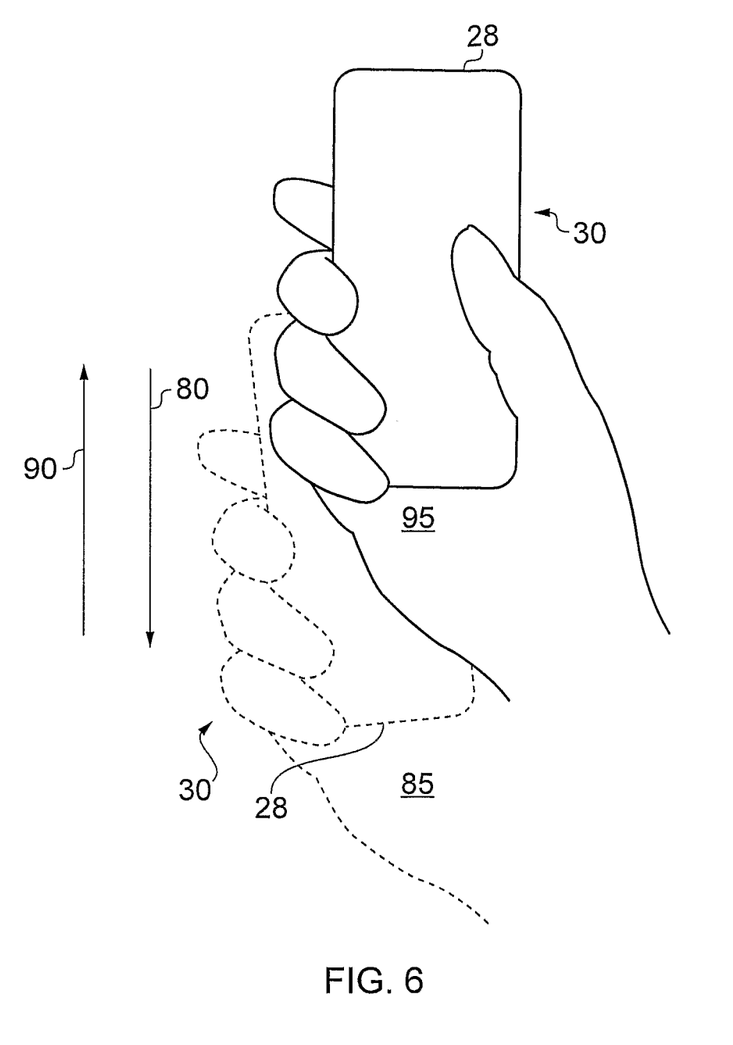
FIG. 6 illustrates a second gesture input.

FIG. 6 illustrates a shaking gesture input that is different to that illustrated in FIG. 4. In the FIG. 6 example, the user moves the apparatus 30 in a first direction 80, from a first position 95 to a second position 85. The user then moves the apparatus 30 in a second direction 90, from the second position 85 to approximately the first position 95. The second direction 90 is substantially opposite to the first direction 80. The user continually moves the apparatus 10/30 from the first position 95 to the second position 85, and vice versa, such that the apparatus 30 is in reciprocal motion. While the gesture input of FIG. 6 is being performed by the user, the apparatus 30 moves to a greater extent vertically than horizontally.

The processor 12 may determine whether the first gesture input or the second gesture input has been made by analyzing one or more acceleration vectors measured by the accelerometer(s) 26 over a period of time (during a gesture input). For example, the processor 12 may analyze the one or more measured acceleration vectors to determine whether movement of the apparatus 30 during the gesture input is greater horizontally or vertically. The processor 12 may determine that the first gesture input (illustrated in FIG. 4) has been made by the user if the apparatus 30 moves to a greater extent horizontally than vertically. The processor 12 may determine that the second gesture input (illustrated in FIG. 6) has been made by the user if the apparatus 30 moves to a greater extent vertically than horizontally.

In some embodiments of the invention, if the processor 12 determines that the gesture input of FIG. 6 has been made (rather than the gesture input of FIG. 4), the processor 12 applies a different visual effect to the second content 57 of FIG. 5A compared to that illustrated in FIG. 5B. For example, the processor may apply a "blurring effect" makes the first content 55 appear as if it is in vertical motion.

The temporal relationship between: i) the user input at block 150 that determines which portion of the output 54 of the display 24 is selected by the processor 12 for alteration at block 160, and ii) the gesture input detected at block 170 may be different, depending upon the implementation of the invention.

In a first implementation, the user provides the input detected at block 150 by touching the display 24 with a digit, and then releases the digit from the display 24 before providing the gesture input of FIG. 4 or FIG. 6, which is detected at block 170.

In second implementation, the user provides the input detected at block 150 by touching the display 24 with a digit. The user continues to hold the digit in place 24 prior to providing the gesture input of FIG. 4 or FIG. 6 and while providing the gesture input of FIG. 4 or FIG. 6, which is detected at block 170.

In a third implementation, the user begins providing the gesture input of FIG. 4 or FIG. 6, and then provides the touch input detected at block 150 by touching the display 24 while providing the gesture input. It may be that the gesture input is detected at block 170 in response to detection of the touch input at block 150.

Various modifications to the method described above are possible. For example, in alternative embodiments of the invention the user may, for example, provide input indicating the content on the display 24 that he wishes to alter (rather than that which he wishes to remain unaltered). In these embodiments of the invention, the user touches the second content (the background) 57 illustrated in FIG. 5A, in order to apply a visual effect to it. Also, the user input detected at block 150 may be provided at a user input device other than a touch sensitive display. For example the user input device may be a keypad, separate to the display of the apparatus 30.

In some embodiments of the invention, the visual effect may be applied to the whole of the image 54 rather than merely a portion 57 of the image 54.

In some exemplary embodiments, the gesture input provided by the user that causes the processor 12 to alter at least a portion of the output of the display 24 need not be a shaking gesture. For example, in some embodiments of the invention, the processor 12 may detect a gesture input which merely involves moving the apparatus 30 in a single direction (such as the direction 60 illustrated in FIG. 4 or, alternatively, the direction 90 illustrated in FIG. 6). The processor 12 may determine whether this gesture input has been provided by determining whether the acceleration measured by the accelerometer(s) 26 exceeds a threshold value.

Figure 7:
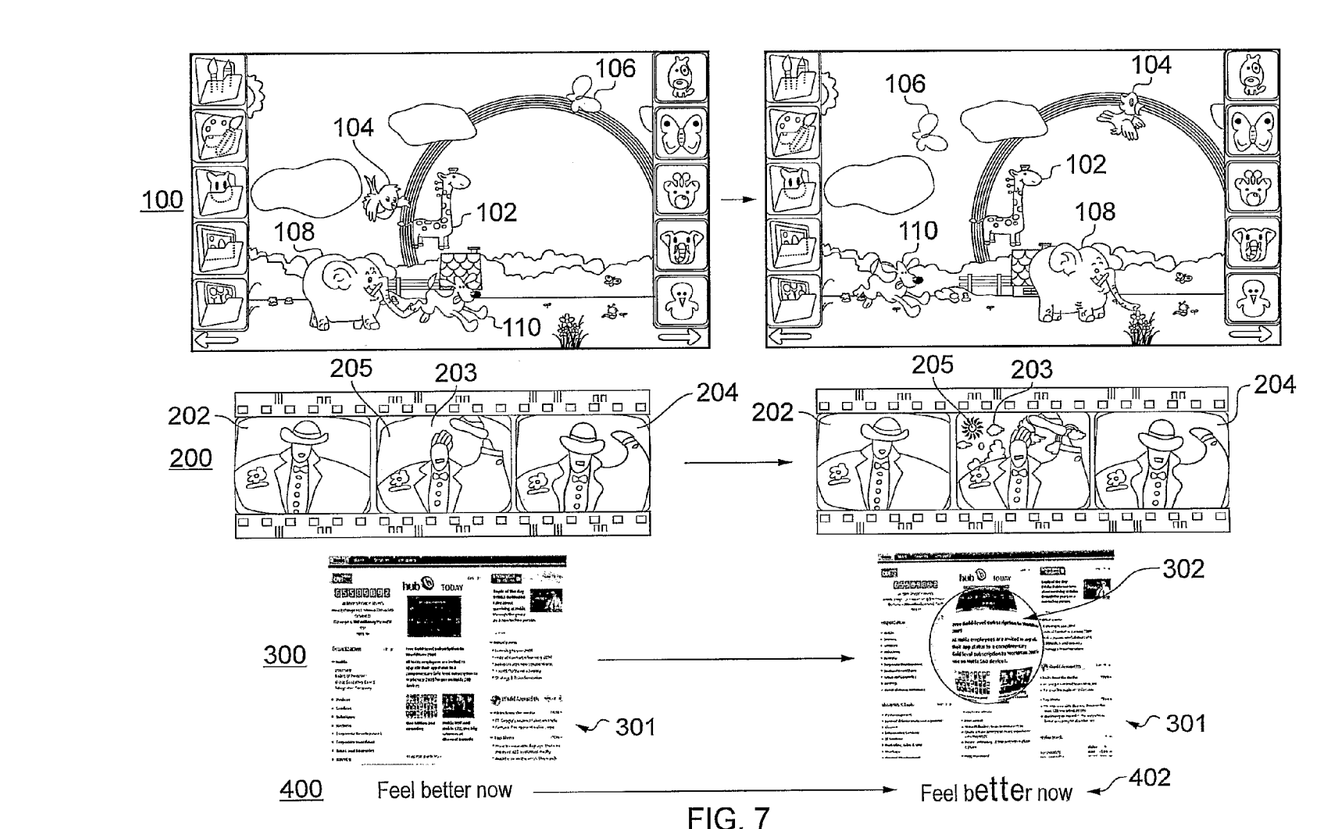
FIG. 7 illustrates a plurality of visual effects.

FIG. 7 illustrates four examples 100, 200, 300 and 400 of how the output of a display may be altered by the processor 12 in response to determining that a gesture input has been made at block 170.

In the first example 100 in FIG. 7, the user provides user input (for instance, touch input) indicating that first content 102 is to remain unaltered. In response to detecting the user input at block 150, the processor 12 selects second content 104, 106, 108 and 110 for alteration. In response to determining that a user has made a gesture input by moving the apparatus 30 at block 170, the processor 12 applies a visual effect by changing the relative positions of portions of the second content 104, 106, 108 and 110 on the display 22/24.

The second example 200 in FIG. 7 relates to an image depicting a negative comprising three sub-images. A user provides input (for instance, touch input) at block 150 indicating that a sub-image 203 is to be altered. In response to determining that a user has made a gesture input by moving the apparatus 30 at block 170, the processor 12 applies a visual effect by changing the background 205 of the sub-image 203.

The third example 300 in FIG. 7 illustrates a web-page 301 being displayed on the display 22/24 of the apparatus 30. The text of the web page 301 is legible on the display 22/24. A user provides input (for instance, touch input) indicating that a portion 302 of the web-page 301 is to be altered. At block 150, the processor 12 selects the relevant portion 302 of the web-page in response to detecting the user input. In response to determining that a user has made a gesture input by moving the apparatus 30 at block 170, the processor 12 applies a visual effect by magnifying the selected portion 302 of the web-page 301.

The fourth example 400 in FIG. 7 relates to text displayed on the display 22/24 of the apparatus 30. The text may, for example, be part of a text message. A user provides input (for instance, touch input) indicating a portion 402 of text to be altered. At block 150, the processor 12 selects the relevant portion 402 of the text in response to detecting the user input. In response to determining that a user has made a gesture input by moving the apparatus 30 at block 170, the processor 12 applies a visual effect by enlarging the selected portion 402 of text.

The blocks illustrated in FIG. 3 may represent steps in a method and/or sections of code in the computer program 16. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. For example, in the examples illustrated in FIGS. 5A, 5B and FIG. 7, the processor 12 alters at least a portion of an image displayed on a display 22/24 by applying a visual effect. In these embodiments of the invention, the display is the "user output device" that provides the output for alteration.

In some other embodiments of the invention, the user output device that provides the output for alteration is not a display. Instead, the user output device providing the output for alteration may be the loudspeaker 27. For example, at block 150 of FIG. 3, a user may provide user input that indicates that at least a portion of the aural output of the loudspeaker is to be altered. For example, the volume of the loudspeaker 27 could be altered, or merely the bass or treble output of the loudspeaker 27.

In response to determining that the user has made an appropriate gesture input by moving the apparatus 30 at block 170, the processor 12 alters at least a portion of the aural output of the loudspeaker 27 (for example, by altering the volume or the bass or treble output).

References to 'a tangible computer-readable storage medium', 'a computer program product', a 'computer', and a 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus, comprising:
   at least one processor; and
   at least one memory storing computer program instructions configured, working with the at least one processor, to cause the apparatus at least to perform:
   detecting user input while first and second portions are output by a user output device;
   selecting, in dependence upon the detected user input, one of the first and second portions that are both being output by the user output device;
   determining, while one of the first and second portions that are being output by the user output device is selected, whether a user makes a gesture input by moving the apparatus; and
   altering, in response to determining that the gesture input has been made by the user, the selected one of the first and second portions that are being output by the user output device while maintaining the other one of the first and second portions unaltered as the first and second portions continue to both be output by the user output device, wherein altering the selected one of the first and second portions comprises introducing a blurring effect to the selected one of the first and second portions while maintaining the other one of the first and second portions unaltered as the first and second portions continue to both be output by the user output device in a same relative position with respect to one another as prior to the altering,
   wherein, in response to the gesture input being a more vigorous shaking, the blurring effect is more pronounced than in response to the gesture input being a less vigorous shaking.

2. An apparatus as claimed in claim 1, wherein determining whether a user makes a gesture input comprises detecting an input from at least one accelerometer co-located with the at least one processor and the at least one memory.

3. An apparatus as claimed in claim 2, wherein alteration of the selected one of the first and second portions that are being output by the user output device depends upon the magnitude of the input from the at least one accelerometer.

4. An apparatus as claimed in claim 1, wherein the gesture input comprises movement of the apparatus in a first direction and a second direction, different to the first direction.

5. An apparatus as claimed in claim 4, wherein determining whether a user makes a gesture input comprises determining whether the apparatus is in reciprocating motion.

6. An apparatus as claimed in claim 5, wherein the gesture input comprises the moving the apparatus in the first direction, from a first position to a second position, and then the moving the apparatus in the second direction, from the second position to approximately the first position.

7. An apparatus as claimed in claim 6, wherein the second direction is substantially opposite to the first direction.

8. An apparatus as claimed in claim 1, wherein determining whether a gesture input is made by the user comprises detecting whether acceleration of the apparatus exceeds a threshold acceleration value.

9. An apparatus as claimed in claim 1, wherein the selected one of the first and second portions that are being output by the user output device is altered by performing a first processing algorithm in response to determining that a first gesture input has been made by the user, or altered by performing a second processing algorithm in response to determining that a second gesture input has been made by the user.

10. An apparatus as claimed in claim 1, wherein the user output device is a loudspeaker.

11. An apparatus as claimed in claim 1, wherein the user output device is a display, selecting one of the first and second portions that are both being output by the display comprises selecting content displayed on the display, and altering the selected one of the first and second portions that are being output by the display comprises altering the selected displayed content.

12. An apparatus as claimed in claim 11, wherein the display is a touch sensitive display, and the user input is detected at the touch sensitive display.

13. An apparatus as claimed in claim 11, wherein the apparatus is a portable electronic apparatus that comprises the display.

14. An apparatus as claimed in claim 1, wherein the blurring effect causes the selected one of the first and second portions to appear to be in horizontal motion in response to determining that the gesture input has more horizontal movement than vertical movement, or the blurring effect causes the selected one of the first and second portions to appear to be in vertical motion in response to determining that the gesture input has more vertical movement than horizontal movement.

15. An apparatus according to claim 1 wherein selecting one of the first and second portions comprises selecting one of the first and second portions of an image presented by a display based upon a visual distinction between a portion identified by the user input and another portion of the image.

16. An apparatus according to claim 15 wherein selecting one of the first and second portions of the image comprises selecting one of the first and second portions of the image based upon differences in contrast between the portion indicated by the user input and another portion of the image.

17. A method, comprising:
   detecting user input while first and second portions are output by a user output device;
   selecting, in dependence upon the detected user input, one of the first and second portions that are both being output by the user output device;
   determining, while one of the first and second portions that are being output by the user output device is selected, whether a user makes a gesture input by moving the apparatus; and
   altering, in response to determining that the gesture input has been made by the user, the selected one of the first and second portions that are being output by the user output device while maintaining the other one of the first and second portions unaltered as the first and second portions continue to both be output by the user output device, wherein altering the selected one of the first and second portions comprises introducing a blurring effect to the selected one of the first and second portions while maintaining the other one of the first and second portions unaltered as the first and second portions continue to both be output by the user output device in a same relative position with respect to one another as prior to the altering,
   wherein, in response to the gesture input being a more vigorous shaking, the blurring effect is more pronounced than in response to the gesture input being a less vigorous shaking.

18. A method as claimed in claim 17, wherein determining whether a user makes a gesture input comprises detecting an input from at least one accelerometer co-located with the at least one processor and the at least one memory.

19. A method as claimed in claim 17, wherein the gesture input comprises movement of the apparatus in a first direction and a second direction, different to the first direction.

20. A method as claimed in claim 19, wherein determining whether a user makes a gesture input comprises determining whether the apparatus is in reciprocating motion.

21. A method according to claim 17 wherein selecting one of the first and second portions comprises selecting one of the first and second portions of an image presented by a display based upon a visual distinction between a portion identified by the user input and another portion of the image.

22. A method according to claim 21 wherein selecting one of the first and second portions of the image comprises selecting one of the first and second portions of the image based upon differences in contrast between the portion indicated by the user input and another portion of the image.

23. A method as claimed in claim 17, wherein the blurring effect causes the selected one of the first and second portions to appear to be in horizontal motion in response to determining that the gesture input has more horizontal movement than vertical movement, or the blurring effect causes the selected one of the first and second portions to appear to be in vertical motion in response to determining that the gesture input has more vertical movement than horizontal movement.

24. A non-transitory computer readable medium storing a computer program comprising computer program instructions configured, when working with at least one processor, to cause an apparatus at least to perform:
   detecting user input while first and second portions are output by a user output device;
   selecting, in dependence upon the detected user input, one of the first and second portions that are both being output by the user output device;
   determining, while one of the first and second portions that are being output by the user output device is selected, whether a user makes a gesture input by moving the apparatus; and
   altering, in response to determining that the gesture input has been made by the user, the selected one of the first and second portions that are being output by the user output device while maintaining the other one of the first and second portions unaltered as the first and second portions continue to both be output by the user output device, wherein altering the selected one of the first and second portions comprises introducing a blurring effect to the selected one of the first and second portions while maintaining the other one of the first and second portions unaltered as the first and second portions continue to both be output by the user output device in a same relative position with respect to one another as prior to the altering, wherein, in response to the gesture input being a more vigorous shaking, the blurring effect is more pronounced than in response to the gesture input being a less vigorous shaking.

25. A computer readable medium as claimed in claim 24, wherein the blurring effect causes the selected one of the first and second portions to appear to be in horizontal motion in response to determining that the gesture input has more horizontal movement than vertical movement, or the blurring effect causes the selected one of the first and second portions to appear to be in vertical motion in response to determining that the gesture input has more vertical movement than horizontal movement.

* * * * *